United States Patent
Xu et al.

(10) Patent No.: US 10,274,740 B2
(45) Date of Patent: Apr. 30, 2019

(54) DISPLAY MODULE COMPRISING LIQUID CRYSTAL LENS, METHOD FOR CONTROLLING DISPLAY MODULE, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Rui Xu, Beijing (CN); Xiaochuan Chen, Beijing (CN); Wenqing Zhao, Beijing (CN); Qian Wang, Beijing (CN); Lei Wang, Beijing (CN); Ming Yang, Beijing (CN); Jian Gao, Beijing (CN); Pengcheng Lu, Beijing (CN); Xiaochen Niu, Beijing (CN); Xiaoliang Ding, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/537,647

(22) PCT Filed: Sep. 30, 2016

(86) PCT No.: PCT/CN2016/101099
§ 371 (c)(1),
(2) Date: Jun. 19, 2017

(87) PCT Pub. No.: WO2017/173792
PCT Pub. Date: Oct. 12, 2017

(65) Prior Publication Data
US 2018/0107012 A1    Apr. 19, 2018

(30) Foreign Application Priority Data
Apr. 7, 2016    (CN) .......................... 2016 1 0214403

(51) Int. Cl.
*G02F 1/29*    (2006.01)
*G02F 1/13*    (2006.01)
(Continued)

(52) U.S. Cl.
CPC ....... *G02B 27/2214* (2013.01); *G02B 3/0056* (2013.01); *G02B 3/0075* (2013.01);
(Continued)

(58) Field of Classification Search
CPC ............ G02B 27/2214; G02B 27/0093; G02B 27/22; G02F 1/1347; G02F 1/13306;
(Continued)

(56) References Cited

U.S. PATENT DOCUMENTS 9,772,503 B2 *   9/2017  Chen ..................... G02B 27/26
2013/0088526 A1   4/2013  Koito et al.
(Continued)

FOREIGN PATENT DOCUMENTS

CN    103037231 A    4/2013
CN    103336398 A    10/2013
(Continued)

OTHER PUBLICATIONS

Shi-Hone Ouyang et al; "Auto-Stereoscopic Display Based on Single-Pixel LC Lens", Chinese Journal of Liquid Crystals and Displays, Aug. 2010; vol. 25, No. 4, 4 pages.
(Continued)

*Primary Examiner* — Huyen L Ngo
(74) *Attorney, Agent, or Firm* — Ladas & Parry LLP (57) ABSTRACT

A display module is disclosed. The display module includes a display panel and a liquid crystal lens. The liquid crystal
(Continued)

lens includes a liquid crystal layer; the liquid crystal lens is on a display side of the display panel and configured to gather, in a horizontal direction, light rays exiting from the display panel together to at least one observation position, which includes a primary observation position corresponding to a center of the display panel and subsidiary observation positions on both sides of the primary observation position. Also disclosed are a display device including the display module and a control method for the display module.

14 Claims, 5 Drawing Sheets

(51) Int. Cl.
| | | |
|---|---|---|
| *G02B 27/22* | (2018.01) | |
| *G02B 3/00* | (2006.01) | |
| *G02B 27/00* | (2006.01) | |
| *G02B 27/42* | (2006.01) | |
| *G09G 3/36* | (2006.01) | |
| *H04N 13/305* | (2018.01) | |
| *G09G 3/00* | (2006.01) | |
| *G02F 1/1343* | (2006.01) | |

(52) U.S. Cl.
CPC ..... *G02B 27/0037* (2013.01); *G02B 27/4205* (2013.01); *G02F 1/1323* (2013.01); *G02F 1/29* (2013.01); *G09G 3/003* (2013.01); *G09G 3/3696* (2013.01); *H04N 13/305* (2018.05); *G02F 1/134309* (2013.01); *G09G 2320/0233* (2013.01); *G09G 2320/068* (2013.01)

(58) Field of Classification Search
CPC .... G02F 1/133526; G02F 1/29; G02F 1/1343; H04N 13/305
See application file for complete search history.

(56) References Cited

U.S. PATENT DOCUMENTS

| | | | |
|---|---|---|---|
| 2013/0249896 A1 | 9/2013 | Hamagishi | |
| 2014/0036176 A1* | 2/2014 | Shinkai | G02B 6/0043 349/15 |
| 2014/0036360 A1 | 2/2014 | Sakamoto et al. | |
| 2014/0152926 A1* | 6/2014 | Takahashi | G02B 27/2214 349/15 |
| 2014/0267993 A1* | 9/2014 | Sugiyama | G02F 1/1337 349/128 |
| 2018/0157145 A1* | 6/2018 | Wang | G02F 1/1343 |

FOREIGN PATENT DOCUMENTS

| | | |
|---|---|---|
| CN | 103581643 A | 2/2014 |
| CN | 103792753 A | 5/2014 |
| CN | 103955100 A | 7/2014 |
| CN | 104122734 A | 10/2014 |
| CN | 105629622 A | 6/2016 |

OTHER PUBLICATIONS

The First Chinese Office Action dated Dec. 27, 2017; Appln. No. 201610214403.5.
The International Search Report and Written Opinion dated Jan. 10, 2017; PCT/CN2016/101099.

* cited by examiner

DISPLAY MODULE COMPRISING LIQUID CRYSTAL LENS, METHOD FOR CONTROLLING DISPLAY MODULE, AND DISPLAY DEVICE

TECHNICAL FIELD

Embodiments of the present disclosure relate to a display module and a control method thereof as well as a display device.

BACKGROUND

Figure 1A:
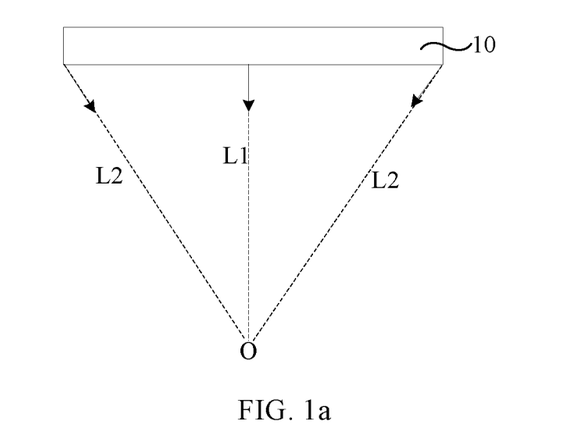
FIG. 1a is a structure diagram of a flat display panel.

When a user is watching a flat display panel 10 at a middle position O facing to the display panel, as illustrated in FIG. 1a, since the distance L1 of the user from the center of the display panel is smaller than the distance L2 of the user from either edge of the display panel, the user receives light rays of relatively higher brightness from the center of the display panel 10 and light rays of relatively lower brightness from the edges of the display panel 10, resulting in variation in brightness and degrading image viewing effects.

Figure 1B:
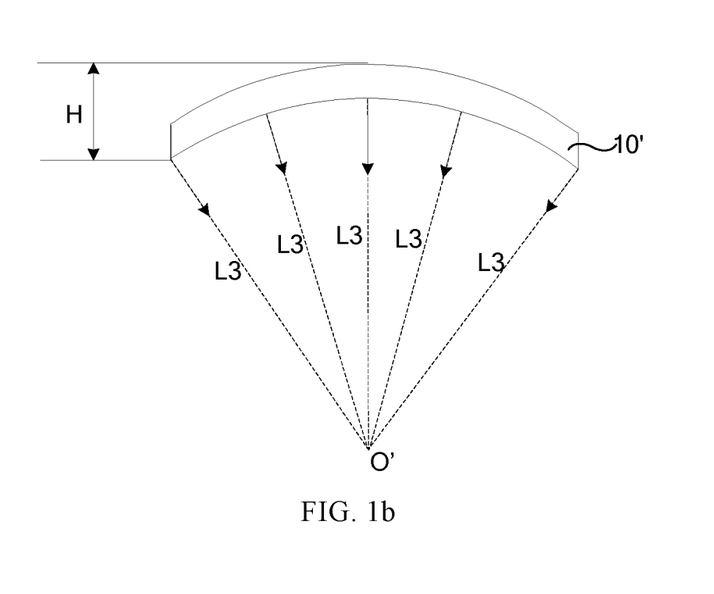
FIG. 1b is a structure diagram of a curved display panel.

FIG. 1b shows a curved display panel 10', which has a certain radian to make the distances of the user at a middle position O' from various parts of the curved display panel 10' approximately equal to each other, preventing the above-mentioned brightness variation.

However, the curved display panel 10' has a relatively large thickness H due to the radian, which is adverse to its placement or suspension and affects user experience.

SUMMARY

An aspect of the present disclosure provides a display module comprising a display panel and a liquid crystal lens that comprises a liquid crystal layer, the liquid crystal lens is on a display side of the display panel and configured to gather, in a horizontal direction, light rays exiting from the display panel together to at least one observation position, which comprises a primary observation position corresponding to a center of the display panel and subsidiary observation positions on both sides of the primary observation position.

For example, the display panel is a flat display panel.

For example, the liquid crystal lens further comprises a first electrode and a second electrode on both sides of the liquid crystal layer and the second electrode comprises a plurality of second sub-electrodes disposed with intervals therebetween; and the first electrode and the second electrode are configured, when applied with voltages, to control liquid crystal molecules in the liquid crystal layer to deflect so as to gather light rays exiting from the display panel together to the primary observation position.

For example, the liquid crystal lens further comprises a third electrode and a fourth electrode on both sides of the liquid crystal layer respectively, the fourth electrode comprises electrode groups disposed with intervals therebetween and each electrode group comprises fourth sub-electrodes disposed with intervals therebetween; and the third electrode and the fourth electrode are configured, when applied with voltages, to control liquid crystal molecules in the liquid crystal layer to deflect so as to gather light rays exiting from the display panel together to the primary observation position and the subsidiary observation positions.

For example, the display panel comprises sub-pixels, and each of the electrode groups corresponds to two adjacent sub-pixels, of which one is used to display images for a left eye and the other is used to display images for a right eye.

For example, the liquid crystal lens comprises an upper substrate and a lower substrate disposed opposite to each other; the first electrode and the fourth electrode are provided on the lower substrate and insulated from each other, and the third electrode and the second electrode are provided on the upper substrate and insulated from each other.

For example, the liquid crystal lens further comprises alignment layers in contact with an upper surface and a lower surface of the liquid crystal layer respectively.

Another aspect of the present disclosure provides a display device comprising any one of the above-described display modules.

Still another aspect of the present disclosure provides a method for controlling the display module, in which, the liquid crystal lens is divided into a left zone and a right zone by a central line of the liquid crystal lens, the method comprising: applying a voltage to the first electrode; applying a voltage to the second electrode in the left zone to form a first gradient electric field having an intensity decreasing gradually from left to right between the second electrode and the first electrode in the left zone; applying a voltage to the second electrode in the right zone to form a second gradient electric field having an intensity decreasing gradually from right to left between the second electrode and the first electrode in the right zone; and deflecting liquid crystal molecules in the liquid crystal layer under an action of the first and second gradient electric fields to form a first micro-lens so as to gather light rays exiting from the display panel together to the primary observation position.

Further another aspect of the present disclosure provides a method for controlling the display module, in which, the liquid crystal lens is divided into a left zone and a right zone by a central line of the liquid crystal lens, the method comprising: applying a voltage to the third electrode; applying voltages to electrode groups in the left zone to form first gradient electric fields, each of which is formed between each electrode group and the third electrode, in the left zone; deflecting liquid crystal molecules in the left zone under an action of the first gradient electric fields to form a plurality of second micro-lenses, each of which corresponds to one electrode group, each of the first gradient electric fields having an intensity decreasing gradually from left to right; applying voltages to electrode groups in the right zone to form second gradient electric fields, each of which is formed between each electrode group and the third electrode, in the right zone; deflecting liquid crystal molecules in the right zone under an action of the second gradient electric fields to form a plurality of third micro-lenses, each of which corresponds to one electrode group, each of the second gradient electric fields having an intensity decreasing gradually from right to left; and gathering light rays exiting from the display panel together to the primary observation position and the subsidiary observation positions under an action of the second and third micro-lenses.

For example, the intensities of the first gradient electric fields decrease in sequence from left to right in the left zone; and the intensities of the second gradient electric fields decrease in sequence from right to left in the right zone.

For example, in the case that the liquid crystal lens comprises the first electrode and the second electrode, the method further comprises applying a same constant voltage to the first electrode and the second electrode.

For example, the same constant voltage is applied to the first electrode and the second electrode before applying the voltage to the third electrode.

Another aspect of the present disclosure provides a method for controlling the display module, in which, in the case that the display panel comprises sub-pixels and each electrode group corresponds to two adjacent sub-pixels, each electrode group is divided into a left zone and a right zone by a central line of the electrode group and the method comprises: applying a voltage to the third electrode; applying a voltage to the left zone of each electrode group to form a first gradient electric field between the left zone of the electrode group and the third electrode, each first gradient electric field having an intensity decreasing in sequence from left to right; applying a voltage to the right zone of each electrode group to form a second gradient electric field between the right zone of each electrode group and the third electrode, each second gradient electric field having an intensity decreasing in sequence from right to left; deflecting liquid crystal molecules in the liquid crystal layer under an action of the first and second gradient electric fields to form fourth micro-lenses, each of which corresponds to one electrode group; and gathering light rays exiting from two adjacent sub-pixels corresponding to a fourth micro-lens together to the left eye and right eye respectively.

Embodiments of the present disclosure provides a display module and a control method therefore, and a display device; the display module comprises a display panel and a liquid crystal lens that comprises a liquid crystal layer; the liquid crystal lens is on a display side of the display panel and configured to gather, in a horizontal direction, light rays exiting from the display panel together to at least one observation position, which comprises a primary observation position corresponding to a center of the display panel and subsidiary observation positions on both sides of the primary observation position. In this way, the liquid crystal lens can gather light rays emitted from the display panel to at least one observation position, the users located at the above observation position(s) can receive light rays of equal or approximately equal brightness in various directions from the display panel, so that the effect of displaying with uniform brightness otherwise obtained by a curved display (e.g., the effect of uniform brightness of curve display) can be achieved for the user at any observation position. Because the display module in the embodiments of the present disclosure use a flat display panel to realize the effect of curve display, the disadvantages of being inconvenient for displacing and suspending for a curve display panel that needs to be curved can be avoided.

BRIEF DESCRIPTION OF DRAWINGS

In order to clearly illustrate the technical solution of the embodiments of the invention, the drawings of the embodiments will be briefly described in the following, it is obvious that the described drawings are only related to some embodiments of the invention and thus are not limitative of the invention. Those skilled in the art will recognize other accompanying drawings according to those without creative work.

REFERENCE NUMERALS

01—left zone; 02—right zone; 10—display panel; 10'—curved display panel; 11—upper substrate; 12—lower substrate; 101—observation plane; 102—central vertical plane; 102'—additional vertical plane; 103—sub-pixel; 20—liquid crystal lens; 201—liquid crystal layer, 211—liquid crystal molecule; 31—first electrode; 32—second electrode; 320—second sub-electrode; 33—third electrode; 34—fourth electrode; 340—electrode group; 341—fourth sub-electrode; 41—first micro-lens; 42—second-micro-lens; 43—third micro-lens; 44—fourth micro-lens; A—observation position; A1—primary observation position; A2—subsidiary observation position; B—horizontal direction; L—left eye; R—right eye.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 2A:
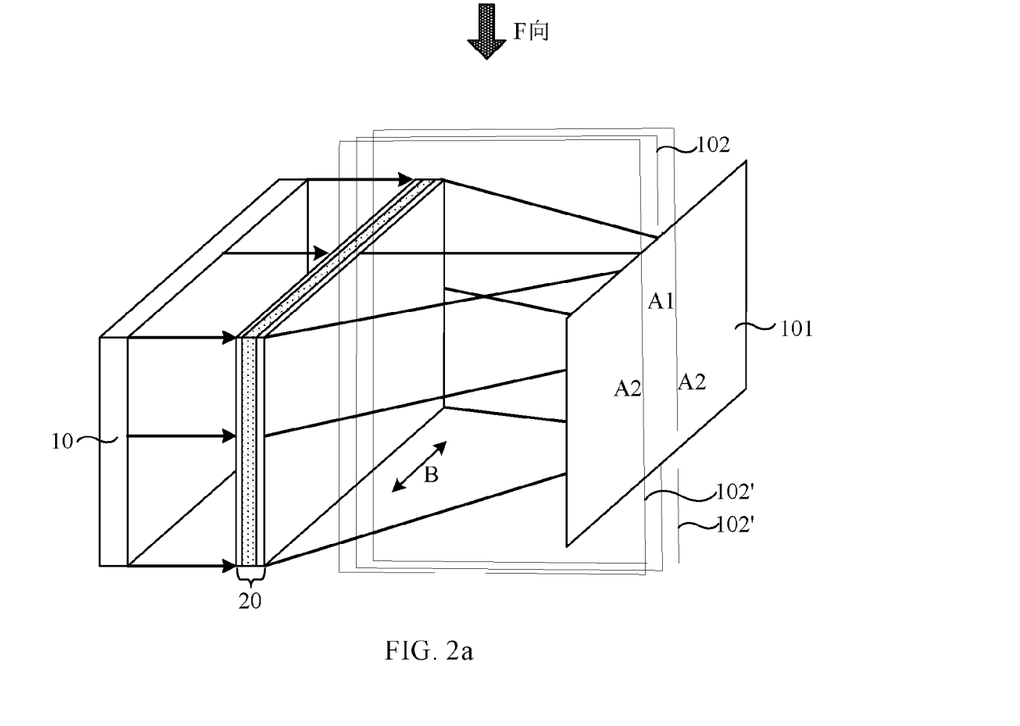
FIG. 2a is a schematic diagram of observation positions for a display module in an embodiment of the present disclosure.
Figure 2B:
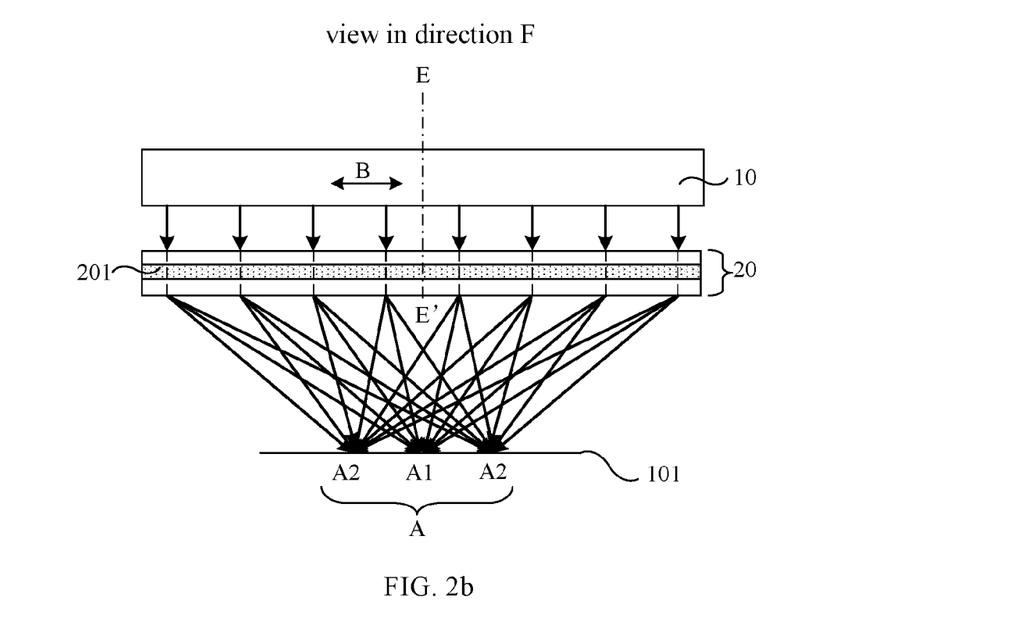
FIG. 2b is a schematic top view of FIG. 2a in direction F.

An embodiment of the present disclosure provides a display module, which, as illustrated in FIG. 2a, includes a display panel 10 and a liquid crystal lens 20. As illustrated in FIG. 2b (a view of FIG. 2a in direction F), the liquid crystal lens 20 includes a liquid crystal layer 201.

For example, the display panel 10 is a flat display panel.

Figure 3:
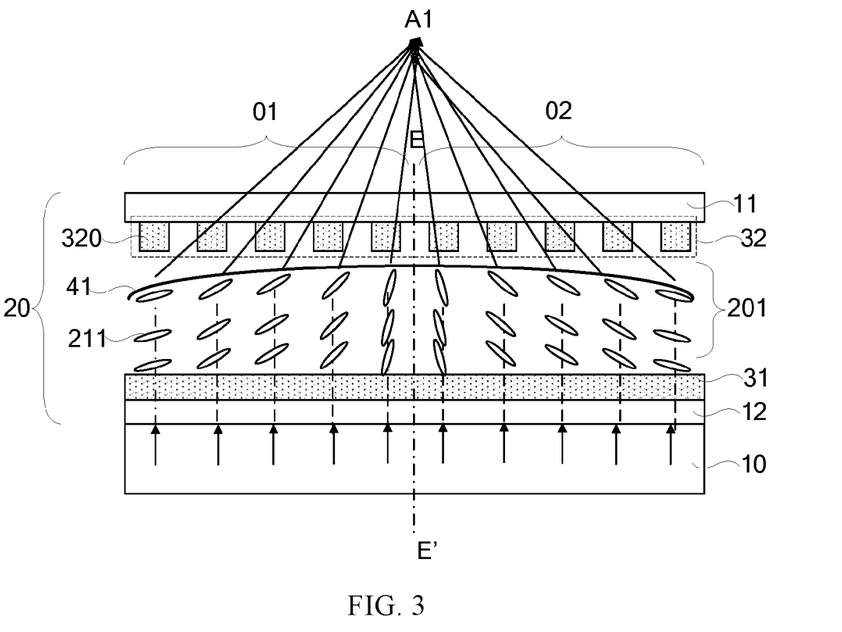
FIG. 3 is a structure diagram of a display module provided in an embodiment of the present disclosure.

For example, as illustrated in FIG. 3, the liquid crystal layer 201 may be located in a liquid crystal cell constituted by an upper substrate 11 and a lower substrate 12. The transparent substrate located at the topmost end on the display side (i.e., the side of the display panel 10 nearest to the lower substrate 12, e.g. the light exiting side of the display panel 10) of the display panel 10 may function as the lower substrate 12 simultaneously. For example, when the display panel 10 includes a color film substrate, the base substrate of the color film substrate may function as the lower substrate 12 simultaneously. For example, the lower substrate 12 may also be a separate transparent substrate.

For example, the display panel 10 may be a LCD (Liquid Crystal Display) panel or an OLED (Organic Light Emitting Diode) display panel, the present disclosure is not limited in this aspect.

For example, as illustrated in FIG. 2b, the liquid crystal lens 20 is located on the display side of the display panel 10 (e.g. the light exiting side of the display panel 10) and configured to gather, in a horizontal direction B, light rays emitted from the display panel 10 together to at least one observation position A. For example, the liquid crystal lens 20 gathers light rays emitted from the display panel 10 together to at least one observation position A by changing, in the horizontal direction B, propagating directions of those light rays.

For example, the term "gather" used in the present disclosure means changing propagating directions of light rays rather than "converging" all of them to a certain point, that is, a user may see images displayed on the display panel 10 at a plurality of observation positions or a plurality of users at a plurality of observation positions may see images displayed on the display panel 10 simultaneously.

For example, the observation position A marked in accompanying figures of the present disclosure (including a primary observation position A1 and subsidiary observation positions A2 on both its sides) is only a schematic illustration for observation positions instead of implying that images displayed on the display panel can only be seen at those observation positions.

For example, the observation position A includes a primary observation position A1 corresponding to the center of the display panel and subsidiary observation positions A2 on both sides of the primary observation position A1.

It is to be noted that, as illustrated in FIG. 2b, the above-mentioned horizontal direction B refers to a direction from the left-side edge to the right-side edge or from the right-side edge to the left-side edge of the display panel 10 when a user is at an observation plane 101 and faces to the display panel 10. That is to say, after light rays emitted from the display panel 10 have passed through the liquid crystal lens 20, the light rays exiting from the left side and the right side may be gathered to the observation position A. For example, the observation plane 101 is parallel with the display panel 10.

In this case, a central vertical plane 102 (as illustrated in FIG. 2a) passes through the center of the display panel 10 or the liquid crystal lens 20 (as illustrated by line E-E' in FIG. 2b) and is perpendicular to the display panel 10 or the liquid crystal lens 20, and the central plane 102 intersects the observation plane 101 at the primary observation position A1. For example, additional vertical planes 102' are provided on both sides of as well as close to and parallel with the central vertical plane 102 and intersect the observation plane 101 at the subsidiary observation positions A2 respectively.

For example, when only one user is watching images, he may be located at the primary observation position A1. If a plurality of users are watching images, in addition to the primary observation position A1, the users may also be located at subsidiary observation positions A2 near the primary observation position A1. Since the liquid crystal lens 20 can gather light rays emitted from the display panel 10 to at least one observation position A (i.e., a primary observation position A1 and subsidiary observation positions A2) described above, the users located at the primary observation position A1 and subsidiary observation positions A2 can receive light rays of equal or approximately equal brightness in various directions from the display panel 10, so that the effect of displaying with uniform brightness otherwise obtained by a curved display can be achieved for the user at any observation position.

For example, with respect to display panels 10 of different sizes, the distances of the subsidiary observation positions A2 from the primary observation position A1 may vary and typically increase with increase of the size of the display panel 10. The distances of the subsidiary observation positions A2 from the primary observation position A1 are not limited in the present disclosure, as long as it can be ensured that the users located at the primary observation position A1 and the subsidiary observation positions A2 can perceive light rays of equal or approximately equal brightness from various parts of the display panel 10.

Directional terms "left", "right". "upper", "lower" etc. used herein are defined with respect to the schematic placement orientations of individual components of the display modules in the accompanying figures and it should be appreciated that those directional terms are relative concepts, used for relative description and clarification and may be changed correspondingly in accordance with change of placement orientations of individual components in the display modules.

Hereafter, specific structures of the liquid crystal lens 20 will be illustrated in details in the case that only one user is watching images or a plurality of users are watching images and the display effect otherwise obtained by a curved display (e.g. the effect of uniform brightness that can be obtained by a curved display) is to be achieved by a display module having a flat display panel.

Embodiment 1

In the present embodiment, only one user is watching images and he can be located at the primary observation position A1; therefore light rays emitted from the display panel 10 may be gathered, along the horizontal direction, together to the primary observation position A1 by the liquid crystal lens 20.

In this case, as illustrated in FIG. 3, the liquid crystal lens 20 may further include a first electrode 31 and a second electrode 32 located on both sides of the liquid crystal layer 201 respectively. The second electrode 32 includes a plurality of second sub-electrodes 320 disposed with intervals therebetween.

For example, when different voltages are applied to the first electrode 31 and the second electrode 32 respectively, an electric field can be formed therebetween and used to control deflecting angles of liquid crystal molecules 211 in the liquid crystal layer 201 so as to gather light rays exiting from the display panel 10 together to the primary observation position A1.

It is to be noted that when no electric field is formed in the liquid crystal lens 20, liquid crystal molecules 211 are in a vertical state as their original state in which the liquid crystal molecules 211 can be orderly arranged and thus ready to be controlled with respect to their deflecting angles. In order to achieve ordered arrangement of liquid crystal molecules 211, alignment layers (not shown in figures) are prepared on and in contact with the upper and lower surfaces of the liquid crystal layer 201. Then the alignment layers are processed for orientation by an optical orientation method or a friction orientation method to enable liquid crystal molecules 211 between the upper and lower alignment layers to be orderly arranged.

For example, since the second electrode 32 includes a plurality of second sub-electrodes 320 disposed with intervals therebetween, when different voltages are applied to different second sub-electrodes 320, different electric fields may be formed between the different second sub-electrodes and the first electrode 31, so that deflecting angles of liquid crystal molecules 211 in the liquid crystal layer 201 may be controlled by zone partition.

For example, when it is needed to gather light rays exiting from the display panel 10 together to the primary observation position A1, deflecting angles of liquid crystal molecules 211 are controlled by zone partition so as to form one first micro-lens 41 (e.g. a convex lens) in the liquid crystal layer 21 that can cover the whole display panel 10. In this way, with the function of light convergence of the first micro-lens 41, light rays exiting from the display panel 10 may be gathered together to the primary observation position A1. For example, the liquid crystal lens 20 may be divided into a left zone 01 and a right zone 02 along its center (i.e., along line E-E'). For example, a voltage is applied to the first electrode 31 and a gradient voltage (i.e., a voltage having an amplitude with gradient change) is applied to the second electrode 32 in the left zone 01, i.e., the voltages applied on the second sub-electrodes 320 decrease gradually from left to right in the left zone 01, so that the electric field formed between the first electrode 31 and the second electrode 32 has an intensity decreasing gradually from left to right in the left zone 01. At this point, deflecting angles of liquid crystal molecules 211 in the liquid crystal layer 201 decrease gradually from left to right in the left zone 01, so that the liquid crystal molecules 211 at the leftmost end are approximately in a horizontal state, while those at the rightmost end (i.e., near the center of the liquid crystal lens 20 in the left zone 01) are approximately in a vertical state.

For example, a gradient voltage is also applied to the second electrode 32 in the right zone 02, i.e., the voltages applied on the second sub-electrodes 320 decrease gradually from right to left in the right zone 02, so that the electric field formed between the first electrode 31 and the second electrode 32 has an intensity decreasing gradually from right to right in the right zone 02. For example, deflecting angles of liquid crystal molecules 211 in the liquid crystal layer 201 decrease gradually from right to left in the right zone 02, so that the liquid crystal molecules 211 at the rightmost end are approximately in a horizontal state while those at the leftmost end of the right zone 02 (i.e., near the center of the liquid crystal lens 20 in the right zone 02) are approximately in a vertical state. In this way, a first micro-lens 41 that can cover the whole display panel 10 may be formed in the liquid crystal layer 201, and with the function of light convergence of the first micro-lens 41 light rays exiting from the display panel 10 may be gathered together to the primary observation position A1.

Embodiment 2

In the present embodiment, a plurality of users are watching images; one of them is located at the primary observation position A1 while the rest of them may be located at the subsidiary observation positions A2 on both sides of the primary observation position A1. The liquid crystal lens 20 may gather, along the horizontal direction, light rays exiting from the display panel together to the primary observation position A1 and the subsidiary observation positions A2.

Figure 4A:
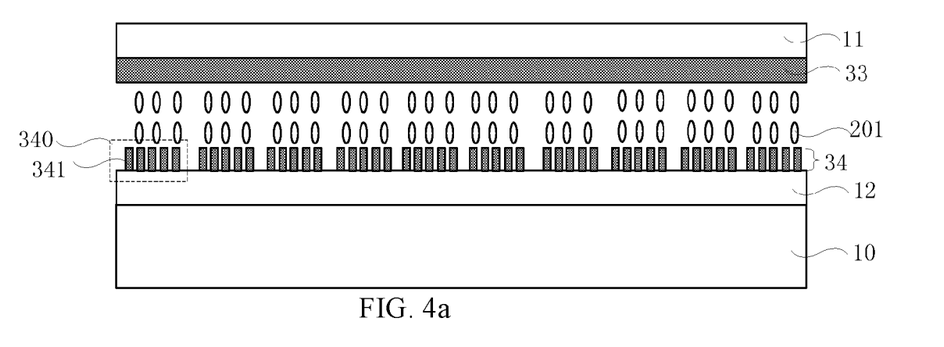
FIG. 4a is a structure diagram of another display module provided in an embodiment of the present disclosure.

For example, as illustrated in FIG. 4a, the liquid crystal lens 20 includes a third electrode 33 and a fourth electrode 34 located on both sides of the liquid crystal layer 201 respectively. The fourth electrode 34 includes electrode groups disposed with intervals therebetween. Each electrode group 340 includes fourth sub-electrodes 341 disposed with intervals therebetween. In order to prevent signal interference from occurring between any two adjacent electrode groups 340, an insulating layer (not shown in figures) may be disposed therebetween.

When different voltages are applied to the third electrode 33 and the fourth electrode 34, an electric field can be formed therebetween and used to control deflecting angles of liquid crystal molecules 211 in the liquid crystal layer 20 so as to gather light rays exiting from the display panel 10 together to the primary observation position A1 and the subsidiary observation positions A2.

Figure 4B:
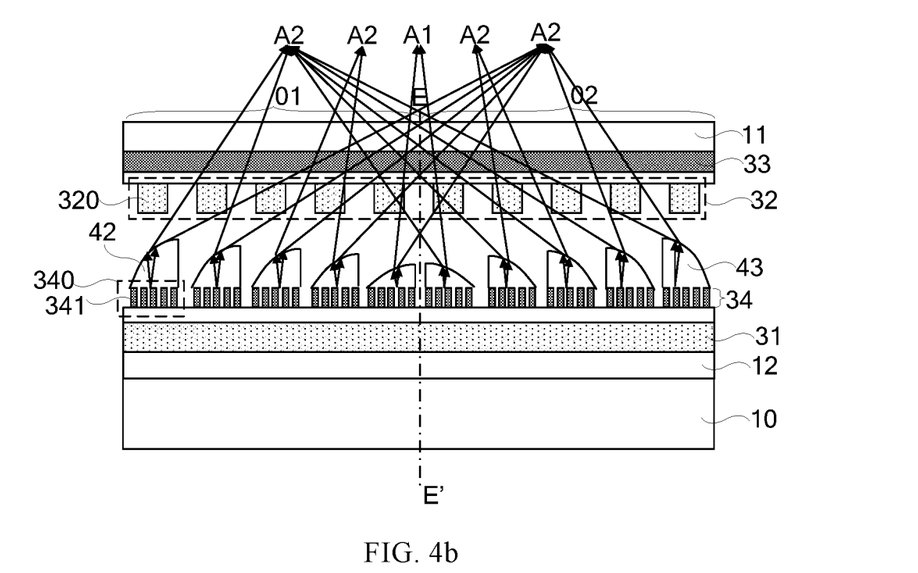
FIG. 4b is a structure diagram of yet another display module provided in an embodiment of the present disclosure.

It is to be noted that, as illustrated in FIG. 4b, the liquid crystal lens 20 may include the first electrode 31, the second electrode 32, the third electrode 33 and the fourth electrode 34 concurrently. For example, the first electrode 31 and the fourth electrode 34 are provided on the lower substrate 12 and insulated from each other by, for example, an insulating layer disposed therebetween. Furthermore, the third electrode 33 and the second electrode 32 are provided on the substrate 11 and insulated from each other by, for example, an insulating layer disposed therebetween.

For example, the first electrode 31 and the third electrode 33 may be planar electrodes while the second sub-electrodes 320 and the fourth sub-electrodes 341 may be strip or block electrodes.

For example, when the third electrode 33 and the fourth electrode 34 are being charged, in order to prevent the first electrode 31 and the second electrode 32 from interfering with the electric field formed by the third electrode 33 and the fourth electrode 34, the first electrode 31 and the second electrode 32 may be applied with the same constant voltage, for example, connected to ground.

For example, since the fourth electrode 34 includes electrode groups 340 disposed with intervals therebetween and each electrode group 340 includes fourth sub-electrodes 341 disposed with intervals therebetween, when different voltages are applied to different fourth sub-electrode 341, different electric fields may be formed between the different fourth sub-electrode 341 and the third electrode 33 so as to control deflecting angles of liquid crystal molecules 211 in the liquid crystal layer 201 by zone partition.

For example, when light rays exiting from the display panel 10 need to be gathered together to the subsidiary observation positions A2, deflecting angles of liquid crystal molecules 211 are controlled by zone partition, so that a plurality of second micro-lenses 42 (e.g. convex lenses) are formed at positions corresponding to electrode groups 340 in the liquid crystal layer 201, as illustrated in FIG. 4b. In this way, with the function of light convergence of the second micro-lenses 42, light rays exiting from the display panel 10 may be gathered together to the primary observation position A1 and the subsidiary observation positions A2. For example, the liquid crystal lens 20 may be divided into a left zone 01 and a right zone 02 along its center (i.e., along line E-E').

For example, a voltage is applied to the third electrode 33 and each electrode group 340 in the left zone is applied with a gradient voltage, for example, in the left zone 01, voltages applied to the fourth sub-electrodes 341 in each electrode group 340 decrease gradually from left to right, so that the electric field formed between each electrode group 340 and the third electrode 33 has an intensity decreasing gradually from left to right, as illustrated in FIG. 4b. At this point, in the left zone 01, deflecting angles of liquid crystal molecules 211 at the position corresponding to each electrode group 340 decrease gradually from left to right, so that the liquid crystal molecules 211 at the leftmost end are approximately in a horizontal state, while those at the rightmost end are approximately in a vertical state. In this way, in the left zone 01, each electrode group 340 corresponds to a second micro-lens 42 and under an action of the second micro-lens 42 light rays exiting from the display panel 10 in the left zone 01 are gathered together to the primary observation position A1 and the subsidiary observation positions A2 on both sides of the primary observation position A1.

For example, the way in which voltages are applied to the electrode groups 340 in the right zone 02 is similar to that described in connection with the left zone 01 and therefore will not repeated here. At this point, in the right zone 02, deflecting angles of liquid crystal molecules at the position corresponding to each electrode group 340 decrease gradually from right to left, so that the liquid crystal molecules 211 at the rightmost end are approximately in a horizontal state, while those at the leftmost end are approximately in a vertical state. In this way, in the right zone 02 as illustrated in FIG. 4b, each electrode group 340 corresponds to a third micro-lens 43 and with the function of the third micro-lens 42 light rays exiting from the display panel 10 in the right zone 02 are gathered together to the primary observation position A1 and the subsidiary observation positions A2 on both sides of the primary observation position A1.

It is to be noted that, for clarity of illustration, FIG. 4b only shows some light rays, and it should not be concluded that only the light rays shown in the figure exist.

For example, in embodiment 2, electrode groups 340 in the left zone 01 and those in the right zone 02 are applied with different gradient voltages respectively to form a plurality of second micro-lenses 42 in the left zone 01 and a plurality of third micro-lenses 43 in the right zone 02, and light rays exiting from the display panel 10 are gathered together to the primary observation position A1 and the subsidiary observation positions A2 by means of the second micro-lenses 42 and the third micro-lenses 43.

It is to be noted that, in the case that the liquid crystal lens 20 has the structure shown in FIG. 4b, in order for a display module having the liquid crystal lens 20 to achieve the display effect otherwise achieved by a curved display when only one user is watching images, the third electrode 33 and the fourth electrode 34 may be applied with the same constant voltage, for example, connected to ground. And the way in which voltages are applied to the first electrode 31 and the second electrode 32 is as described in embodiment 1.

Figure 5:
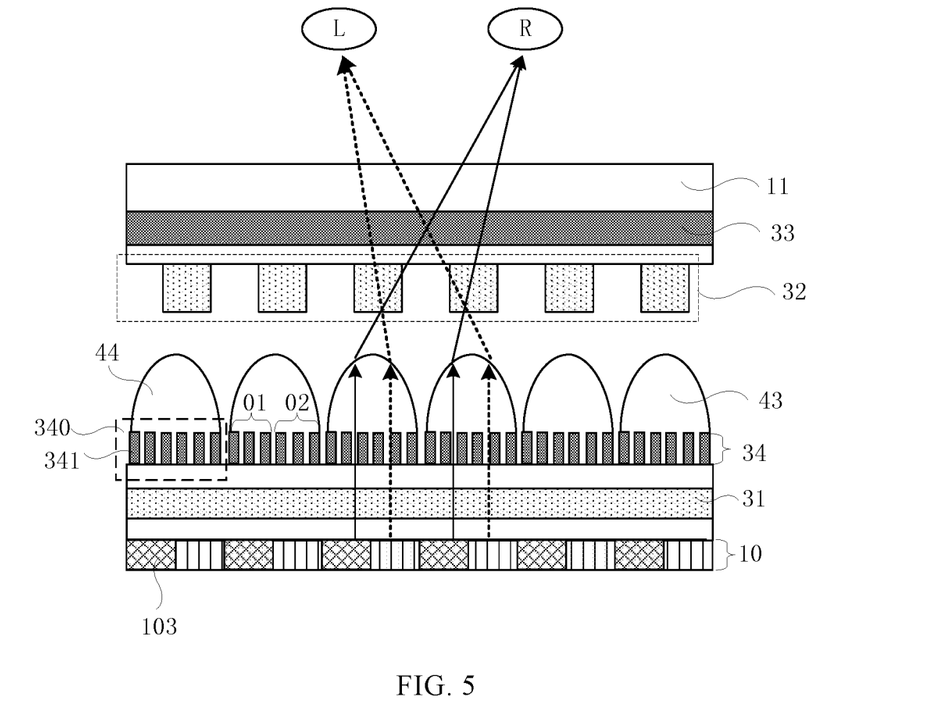
FIG. 5 is a schematic diagram illustrating that the display module as illustrated in FIG. 4b realizes 3D display.

For example, 3D display may be achieved using the liquid crystal lenses shown in FIG. 4a or 4b. As illustrated in FIG. 5, the display panel 10 includes sub-pixels 103 and each electrode group 340 corresponds to two adjacent sub-pixels 103, of which one is used to display images for the left eye and the other is used to display images for the right eye.

For example, when light rays exiting from two adjacent sub-pixels 103 need to be gathered together to the left eye L and the right eye R respectively, different voltages may be input to different electrode groups 340 to control deflecting angles of liquid crystal molecules 211 in the liquid crystal layer 201 by zone partition, so that a plurality of fourth micro-lenses 44 are formed at positions corresponding to electrode groups 340 in the liquid crystal layer 201 as illustrated in FIG. 5 and with the function of the fourth micro-lenses 44 light rays exiting from adjacent sub-pixels 103 may be gathered together to the left eye L and the right eye R respectively.

For example, an electrode group 340 may be divided into a left zone 01 and a right zone 02 along the center of the electrode group 340. For example, when the liquid crystal lens 20 includes the first electrode 31 and the second electrode 32, these two electrodes are connected to ground and a voltage is applied to the third electrode 33. A gradient voltage is applied to the left zone 01 of each electrode group 340, for example, in the left zone 01 of the electrode group 340, voltages applied to the fourth sub-electrodes 341 decrease gradually from left to right to form an electric field between the left zone 01 of the electrode group 340 and the third electrode 33 that has an intensity decreasing gradually from left to right as illustrated in FIG. 5, so that in the left zone 01 the liquid crystal molecules 211 at the leftmost end are approximately in a horizontal state while those at the rightmost end are approximately in a vertical state.

For example, a gradient voltage is also applied to the right zone 02 of each electrode group 340, for example, in the right zone 02 of the electrode group 340, voltages applied to the fourth sub-electrodes 341 decrease gradually from right to left to form an electric field between the right zone 02 of the electrode group 340 and the third electrode 33 that has an intensity decreasing gradually from right to left as illustrated in FIG. 5, so that in the right zone 02 the liquid crystal molecules 211 at the rightmost end are approximately in a horizontal state while those at the leftmost end are approximately in a vertical state.

In this way, at each position corresponding to an electrode group 340 in the liquid crystal layer 201 there may be formed one fourth micro-lens 44 and light rays from adjacent sub-pixels 103 may be gathered together to the left eye L and the right eye R respectively by means of a fourth micro-lens 44.

It is to be noted that the first electrode 31, the second electrode 32, the third electrode 33 and the fourth electrode 34 may fabricated using transparent conductor materials, such as indium tin oxide or indium tin oxide. Alternatively, the first electrode 31, the second electrode 32, the third electrode 33 and the fourth electrode 34 may also be fabricated using metal materials with very thin thicknesses to guarantee their transmittivity for light rays.

An embodiment of the present disclosure provides a display unit including any of the display modules described above. Since the structures and beneficial effects of the display modules have been explained in details in the embodiments described above and will not be repeated here.

It is to be noted that, in the embodiment of the present disclosure, the display device may at least include a liquid crystal display device or an organic LED display device, for example, the display device may be a liquid crystal display, a liquid crystal television, a digital picture frame, a mobile telephone, a tablet computer or any other product or component having display functionality.

Figure 6:
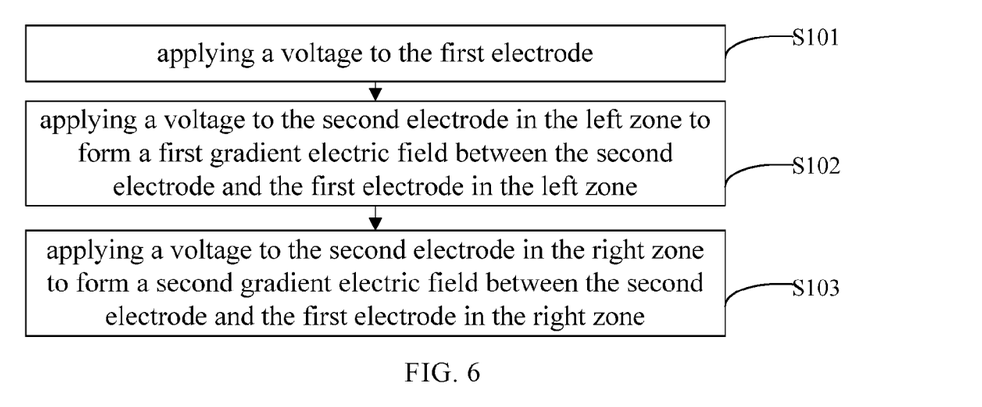
FIG. 6 is a flow chart of a method for controlling the display module shown in FIG. 3 provided in an embodiment of the present disclosure.

An embodiment of the present disclosure provides a method for controlling the display module as illustrated in FIG. 3, wherein the liquid crystal lens 20 is divided into a left zone 01 and a right zone 02 along its center (line E-E') as illustrated in FIG. 6. The method includes the following steps.

In step S101, a voltage is applied to the first electrode 31.

In step S102, a voltage is applied to the second electrode 32 in the left zone 01 to form a first gradient electric field having an intensity decreasing gradually from left to right between the second electrode 32 in the left zone 01 and the first electrode 31.

For example, voltages applied to the second sub-electrodes 320 decrease gradually from left to right in the left zone 01 to make the electric field formed between the first electrode 31 and the second electrode 32 in the left zone 01 have an intensity decreasing gradually from left to right. At this point, in the left zone 01, deflecting angles of liquid crystal molecules 211 in the liquid crystal layer 201 decrease gradually from left to right, so that the liquid crystal molecules 211 at the leftmost end are approximately in a horizontal state, while those at the rightmost end are approximately in a vertical state.

In step S103, a voltage is applied to the second electrode 32 in the right zone 02 to form a second gradient electric field having an intensity decreasing gradually from right to left between the second electrode 32 in the right zone 02 and the first electrode 31.

For example, voltages applied to the second sub-electrodes 320 decrease gradually from right to left in the right zone 02 to make the electric field formed between the first electrode 31 and the second electrode 32 in the right zone 02 have an intensity decreasing gradually from right to left. At this point, in the right zone 02, deflecting angles of liquid crystal molecules 211 in the liquid crystal layer 201 decrease gradually from right to left, so that the liquid crystal molecules 211 at the rightmost end are approximately in a horizontal state, while those at the leftmost end are approximately in a vertical state.

In this way, under an action of the first and second gradient electric fields, liquid crystal molecules 211 in the liquid crystal layer 20 deflect to form a first micro-lens 41 covering the whole display panel 10, so that with the function of light convergence of the first micro-lens 41 light rays exiting from the display panel 10 are gathered together to the primary observation position A1. Therefore, when only one user is watching images, he can be located at the primary observation position A1 to perceive the display effect otherwise achieved by a curved display.

For example, the order of the steps S101, S102 and S103 is not limited here.

Figure 7:
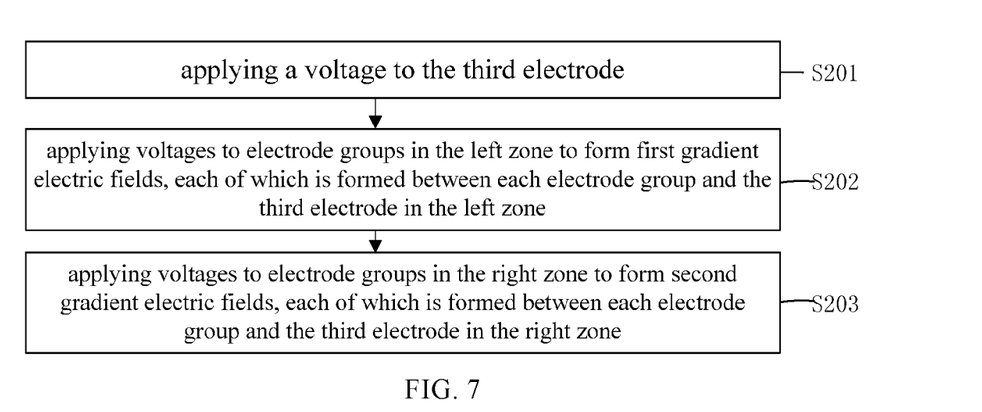
FIG. 7 is a flow chart of another method for controlling the display module shown in FIG. 4a or 4b provided in an embodiment of the present disclosure.

An embodiment of the present disclosure provides a method for controlling the display module as illustrated in FIG. 4a or 4b, wherein the liquid crystal lens 40 is divided into a left zone 01 and a right zone 02 along its center (line E-E') as illustrated in FIG. 7. The method may include the following steps.

In step S201, a voltage is applied to the third electrode 33.

It is to be noted that when the liquid crystal lens 20 includes the first electrode 31 and the second electrode 32 as illustrated in FIG. 4b, in order to prevent the first electrode 31 and the second electrode 32 from interfering the electric field formed between the third electrode 33 and the fourth electrode 34, the same constant voltage may be applied to the first electrode 31 and the second electrode 32 before performing step S201, for example, the first electrode 31 and the second electrode 32 are connected to ground.

In step S202, voltages are applied to electrode groups 340 in the left zone 01, so that the third electrode 33 and each electrode group 340 in the left zone 01 have a first gradient electric field formed therebetween.

For example, in the left zone 01, voltages applied to the fourth sub-electrodes 341 in each electrode group 340 decrease gradually from left to right to form an first gradient electric field having an intensity decreasing gradually from left to right between the electrode group 340 and the third electrode 33.

At this point, under an action of the first gradient electric fields, liquid crystal molecules 211 in the left zone 01 deflect to form a plurality of second micro-lenses 42, each of which corresponds to one electrode group 340. For example, under an action of the first gradient electric fields, in the left zone 01, deflecting angles of liquid crystal molecules at the position corresponding to each electrode group 340 decrease gradually from left to right, so that liquid crystal molecules 211 at the leftmost end are approximately in a horizontal state and those at the rightmost end are approximately in a vertical state. In this way, in the left zone 01, each electrode group 340 corresponds to a second micro-lens 42 and under an action of the second micro-lenses 42 light rays exiting from the display panel 10 in the left zone 01 are gathered together to the primary observation position A1 and the subsidiary observation positions A2 on the left side of the primary observation position A1.

In step S203, voltages are applied to electrode groups 340 in the right zone 02, so that the third electrode 33 and each electrode group 340 in the right zone 02 have a second gradient electric field formed therebetween.

For example, voltages applied to the second sub-electrodes 320 decrease gradually from right to left in the right zone 02 to make the second gradient electric field formed between the first electrode 31 and the second electrode 32 in the right zone 02 have an intensity decreasing gradually from right to left.

Moreover, under an action of the second gradient electric fields, liquid crystal molecules 211 in the right zone 02 deflect to form a plurality of third micro-lenses 43, each of which corresponds to one electrode group. For example, in the right zone 02, deflecting angles of liquid crystal molecules at the position corresponding to each electrode group 340 decrease gradually from right to left, so that the liquid crystal molecules 211 at the rightmost end are approximately in a horizontal state, while those at the leftmost end are approximately in a vertical state. In this way, in the right zone 02 as illustrated in FIG. 4b, each electrode group 340 corresponds to a third micro-lens 43 and with the function of the third micro-lenses 42 light rays exiting from the display panel 10 in the right zone 02 are gathered together to the primary observation position A1 and the subsidiary observation positions A2 on right side of the primary observation position A1.

In this way, with the function of the second micro-lenses 42 and the third micro-lenses 43, light rays exiting from the display panel 10 may be gathered together to the primary observation position A1 and the subsidiary observation positions A2. In this case, when a plurality of users are watching images, one of them is located at the primary observation position A1 and the rest of them may be located at subsidiary observation positions A2 on both sides of the primary observation position A1, so that all of the plurality of users can see images of relatively uniform brightness.

It is to be noted that since the subsidiary observation positions A2 are in the vicinity of the primary observation position A1 and therefore are farther away from the left or right side of the display panel 10, the effect of gathering light rays from the left and right sides of the display panel 10 needs to be enhanced in order to improve the brightness of light rays from both of the sides.

In this case, the intensity of the electric field applied on the liquid crystal layer 20 should be increased on the left and right sides of the display panel 10. For example, in the left zone 01, the intensities of the first gradient electric fields decrease gradually from left to right, i.e., the intensity of the first gradient electric field formed between the electrode group 340 at the leftmost end of the left zone 01 and the third electrode 33 is the highest while the intensity of the first gradient electric field formed between the electrode group 340 at the rightmost end and the third electrode 33 is the lowest. Furthermore, in the right zone, the intensities of the second gradient electric fields decrease gradually from right to left, i.e., the intensity of the second gradient electric field formed between the electrode group 340 at the rightmost end of the right zone 02 and the third electrode 33 is the highest while the intensity of the second gradient electric field formed between the electrode group 340 at the leftmost end and the third electrode 33 is the lowest. In this way, the intensities of the electric fields applied on the liquid crystal layer 20 on the left and right sides of the display panel 10 are the highest, so that the effect of gathering light rays from the left and right sides of the display panel 10 is effectively enhanced.

Figure 8:
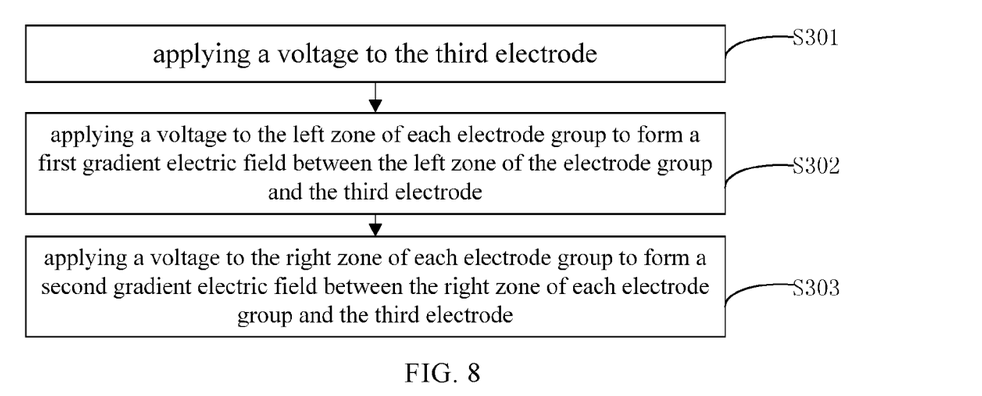
FIG. 8 is a flow chart of another method for controlling the display module shown in FIG. 4a or 4b to realize 3D display provided in an embodiment of the present disclosure.

An embodiment of the present disclosure provides a method for controlling a display module, as illustrated in FIG. 5. In the case that the display panel 10 includes sub-pixels 103 and each electrode group 340 corresponds to two adjacent sub-pixels 103, an electrode groups 340 is divided into a left zone 01 and a right zone 02 along its center. As illustrated in FIG. 8, then the control method may include the following steps.

In step S301, a voltage is applied to the third electrode 33.

In step S302, the left zone 01 of each electrode group 340 is applied with a voltage to form a first gradient electric field between the left zone 01 of the electrode group 340 and the third electrode 33. At this point, each first gradient electric field has an intensity decreasing gradually from left to right.

For example, in the left zone 01 of an electrode group 340, voltages applied to the fourth sub-electrodes 341 decrease gradually from left to right to form an electric field having an intensity decreasing from left to right between the left zone 01 of the electrode group 340 and the third electrode 33 as illustrated in FIG. 5, so that the liquid crystal molecules 211 at the leftmost end of the left zone 01 are approximately in a horizontal state while those at the rightmost end are approximately in a vertical state.

In step S303, the right zone 02 of each electrode group 340 is applied with a voltage to form a second gradient electric field between the right zone 02 of the electrode group 340 and the third electrode 33. Each second gradient electric field has an intensity decreasing gradually from right to left.

For example, in the right zone 02 of an electrode group 340, voltages applied to the fourth sub-electrodes 341 decrease gradually from right to left to form an electric filed having an intensity decreasing from right to left between the right zone 02 of the electrode group 340 and the third 33 as illustrated in FIG. 5, so that the liquid crystal molecules 211 at the rightmost end of the right zone 02 are approximately in a horizontal state while those at the leftmost end are approximately in a vertical state.

In this way, under an action of the first and second gradient electric fields, liquid crystal molecules in the liquid crystal layer deflect to form individual fourth micro-lenses 44, each of which corresponds to one electrode group 340. And with the function of the fourth micro-lens 44, light rays exiting from two adjacent sub-pixels corresponding to a fourth micro-lens 44 are gathered together to the left eye L and the right eye R respectively, realizing 3D display.

What has been described above is only specific implementation of the present disclosure, and the scope claimed by the present disclosure is not limited to this; changes and alternatives may readily occur to those skilled in the art in consideration of the technical disclosure of the present disclosure, which fall within the scope claimed by the present disclosure. Therefore, the scope claimed by the present disclosure is only defined by the scope of the claims.

The application claims priority to the Chinese patent application No. 201610214403.5, filed Apr. 7, 2016, the entire disclosure of which is incorporated herein by reference as part of the present application.

What is claimed is:

1. A display module comprising a display panel and a liquid crystal lens that comprises a liquid crystal layer,
   wherein the liquid crystal lens is on a display side of the display panel and configured to gather, in a horizontal direction, light rays exiting from the display panel together to at least one observation position, which comprises a primary observation position corresponding to a center of the display panel and subsidiary observation positions on both sides of the primary observation position;
   the liquid crystal lens further comprises a third electrode and a fourth electrode, the third electrode is on a first side of the liquid crystal layer, the fourth electrode is on a second side of the liquid crystal layer, the fourth electrode comprises electrode groups disposed with intervals therebetween and each electrode group comprises fourth sub-electrodes disposed with intervals therebetween; and
   the third electrode and the fourth electrode are configured, when applied with voltages, to control liquid crystal molecules in the liquid crystal layer to deflect so as to gather light rays exiting from the display panel together to the primary observation position and the subsidiary observation positions;
   wherein the liquid crystal lens further comprises a first electrode and a second electrode, the first electrode is on the second side of the liquid crystal layer along with the fourth electrode, the second electrode is on the first side of the liquid crystal layer along with the third electrode, and the second electrode comprises a plurality of second sub-electrodes disposed with intervals therebetween; and
   the first electrode and the second electrode are configured, when applied with voltages, to control liquid crystal molecules in the liquid crystal layer to deflect so as to gather light rays exiting from the display panel together to the primary observation position.

2. The display module of claim 1, wherein the display panel is a flat display panel.

3. The display module of claim 1, wherein the display panel comprises sub-pixels, and each of the electrode groups corresponds to two adjacent sub-pixels, of which one is used to display images for a left eye and the other is used to display images for a right eye.

4. A method for controlling the display module of claim 3, wherein, in the case that the display panel comprises sub-pixels and each electrode group corresponds to two adjacent sub-pixels, each electrode group is divided into a left zone and a right zone by a central line of the electrode group and the method comprises:
   applying a voltage to the third electrode;
   applying a voltage to the left zone of each electrode group to form a first gradient electric field between the left zone of the electrode group and the third electrode, each first gradient electric field having an intensity decreasing in sequence from left to right;
   applying a voltage to the right zone of each electrode group to form a second gradient electric field between the right zone of each electrode group and the third electrode, each second gradient electric field having an intensity decreasing in sequence from right to left;
   deflecting liquid crystal molecules in the liquid crystal layer under an action of the first and second gradient electric fields to form fourth micro-lenses, each of which corresponds to one electrode group; and gathering light rays exiting from two adjacent sub-pixels corresponding to a fourth micro-lens together to the left eye and right eye respectively.

5. The display module of claim 3, wherein the liquid crystal lens comprises an upper substrate and a lower substrate disposed opposite to each other;
the first electrode and the fourth electrode are provided on the lower substrate and insulated from each other; and
the third electrode and the second electrode are provided on the upper substrate and insulated from each other.

6. The display module of claim 3, wherein the liquid crystal lens further comprises alignment layers in contact with an upper surface and a lower surface of the liquid crystal layer respectively.

7. The display module of claim 1, wherein the liquid crystal lens comprises an upper substrate and a lower substrate disposed opposite to each other:
the first electrode and the fourth electrode are provided on the lower substrate and insulated from each other; and
the third electrode and the second electrode are provided on the upper substrate and insulated from each other.

8. The display module of any one of claim 1, wherein the liquid crystal lens further comprises alignment layers in contact with an upper surface and a lower surface of the liquid crystal layer respectively.

9. A display device comprising the display module of claim 1.

10. A method for controlling the display module of claim 1, wherein the liquid crystal lens is divided into a left zone and a right zone by a central line of the liquid crystal lens, the method comprising:
applying a voltage to the first electrode;
applying a voltage to the second electrode in the left zone to form a first gradient electric field having an intensity decreasing gradually from left to right between the second electrode and the first electrode in the left zone;
applying a voltage to the second electrode in the right zone to form a second gradient electric field having an intensity decreasing gradually from right to left between the second electrode and the first electrode in the right zone; and
deflecting liquid crystal molecules in the liquid crystal layer under an action of the first and second gradient electric fields to form a first micro-lens so as to gather light rays exiting from the display panel together to the primary observation position.

11. A method for controlling the display module of claim 1, wherein the liquid crystal lens is divided into a left zone and a right zone by a central line of the liquid crystal lens, the method comprising:
applying a voltage to the third electrode;
applying voltages to electrode groups in the left zone to form first gradient electric fields, each of which is formed between each electrode group and the third electrode, in the left zone;
deflecting liquid crystal molecules in the left zone under an action of the first gradient electric fields to form a plurality of second micro-lenses, each of which corresponds to one electrode group, each of the first gradient electric fields having an intensity decreasing gradually from left to right;
applying voltages to electrode groups in the right zone to form second gradient electric fields, each of which is formed between each electrode group and the third electrode, in the right zone;
deflecting liquid crystal molecules in the right zone under an action of the second gradient electric fields to form a plurality of third micro-lenses, each of which corresponds to one electrode group, each of the second gradient electric fields having an intensity decreasing gradually from right to left; and
gathering light rays exiting from the display panel together to the primary observation position and the subsidiary observation positions under an action of the second and third micro-lenses.

12. The method for controlling the display module of claim 11, wherein the intensities of the first gradient electric fields decrease in sequence from left to right in the left zone; and
the intensities of the second gradient electric fields decrease in sequence from right to left in the right zone.

13. The method for controlling the display module of claim 11, wherein, in the case that the liquid crystal lens comprises the first electrode and the second electrode, the method further comprises applying a same constant voltage to the first electrode and the second electrode.

14. The method for controlling the display module of claim 11, wherein the same constant voltage is applied to the first electrode and the second electrode before applying the voltage to the third electrode.

* * * * *